Dec. 5, 1961   D. L. LACKEY ET AL   3,011,878
PROCESS OF SOLIDIFYING A CONCENTRATED SOLUTION
OF ALUMINUM SULFATE CONTAINING
SOLID ALUMINUM SULFATE
Filed Nov. 26, 1958
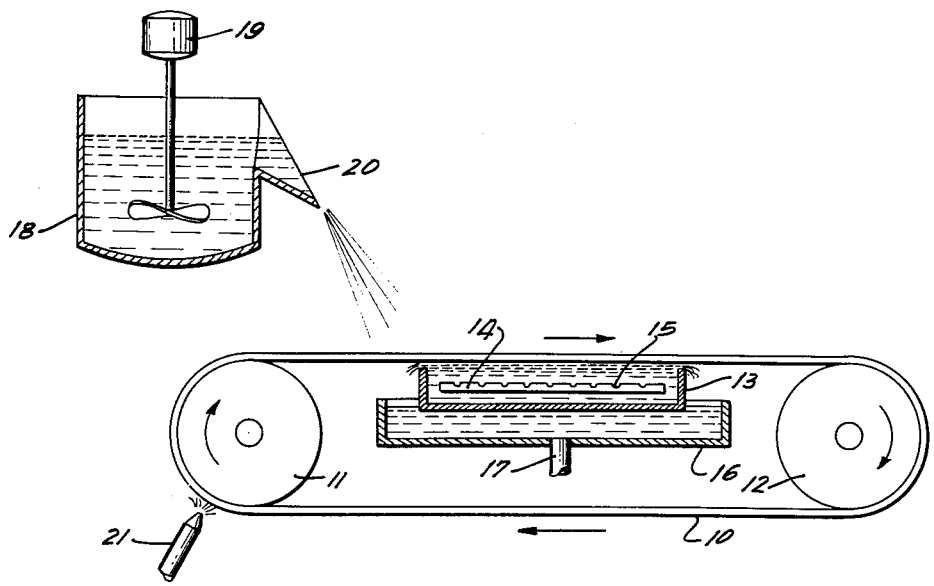
INVENTORS.
DARYL L. LACKEY
DONALD A. ROPER
BY
*Richard W. Sternberg*
ATTORNEY

United States Patent Office 3,011,878
Patented Dec. 5, 1961

3,011,878
PROCESS OF SOLIDIFYING A CONCENTRATED SOLUTION OF ALUMINUM SULFATE CONTAINING SOLID ALUMINUM SULFATE
Daryl L. Lackey, St. Louis, and Donald A. Roper, Creve Coeur, Mo., assignors to Monsanto Chemical Company, St. Louis, Mo., a corporation of Delaware
Filed Nov. 26, 1958, Ser. No. 776,554
15 Claims. (Cl. 23—293)

This invention relates to improvements in the manufacture of sulfates of alumina, specifically those having basicities of from neutral to about 8 percent.

Sulfates of alumina which have basicities of from neutral to about 8 percent contain from about 16 to about 18 percent soluble alumina, i.e., $Al_2O_3$, and from about 40 to about 45 percent water. They are prepared commercially by initially reacting bauxite, commercial aluminum hydrate or other acid soluble aluminous material with sulfuric acid of 50 to 55° Bé. strength, with the addition of water or wash liquors so that an aqueous solution of neutral or basic sulfate of alumina containing from about 4 to about 13 percent $Al_2O_3$ results. This aqueous solution is subsequently concentrated by boiling to provide a concentrated solution having a basicity of from neutral to about 8 percent containing from about 16 to about 18 percent $Al_2O_3$ and from about 40 to about 45 percent water which concentrated solution is run into molds or pans and air-cooled to a solid cake of approximately 4 inches in thickness.

While the aforedescribed solidification procedure is employed throughout the industry, it is time-consuming and extremely cumbersome. It is time-consuming in that it requires 12 hours or longer to complete the cooling and solidification operation because the outer surface of the solution solidifies to form a hard shell with poor heat-conducting properties and this shell greatly retards the dissipation of heat from the interior. This solidification procedure is extremely cumbersome in that the solution on solidifying adheres to the surface of the pan or mold providing a hard cement-like structure which requires considerable time and labor to remove from the pan or mold which cement-like product is difficult not only to remove but to break down to a reasonable size for the subsequent grinding operation. The usual procedure is for an operator to use a pinch bar to lift up or part the solid cake from the pan or mold and to use a sledge hammer to break down the solid cake in the mold or pan. Thereafter the broken-down cake is shoveled onto a conveyor which carries the solids to the storage bin or to the grinding system.

In accordance with this invention there is provided a process which overcomes these time-consuming and cumbersome operations which characterize prior solidification procedures.

The instant invention is carried out in general by first preparing an aqueous solution of a sulfate of alumina having a basicity of from neutral to about 8 percent and containing from about 4 to about 13 percent $Al_2O_3$, as for example by the commercial method described hereinbefore, and boiling down the resultant solution to provide a concentrated solution containing from about 16 to about 18 percent $Al_2O_3$ and from about 40 to about 45 percent water. This heated concentrated solution, which is characterized by a basicity of from neutral to about 8 percent, is partially crystallized or solidified to provide a flowable concentrate and then fed or applied, preferably in a continuous manner, to the surface of a moving impervious support which support is sufficiently cooled to permit solidification of the applied flowable concentrate thereon which cooled solid product is subsequently discharged from said support leaving no or substantially no adhering material thereon. It is necessary that the rate of feeding or application of the said heated flowable concentrate to the said cooled moving impervious support and the rate of movement of the said cooled moving impervious support be such, respectively, that the total elapsed time on said support of an increment of sulfate of alumina (neutral or basic, as the case may be) from its point of application in said flowable concentrate form to the moving support to the point of discharge in solid form from said support be in the range of 4 to about 15 minutes for each ⅜ inch average thickness of cake or solid obtained on said support on cooling the flowable concentrate fed or applied to the said moving support, said elapsed time being not less than about 2 minutes. The thickness of the cake or solid on said support obtained on cooling the applied film of the heated flowable concentrate at any one point on the moving support should not exceed about one inch and in general should not be less than 0.1 inch thickness.

It is particularly preferred that the surface of the cooled moving support to which the heated flowable concentrate is fed or applied be moistened or wetted with water prior to the contacting thereof with the said flowable concentrate. In general a thin film of water of up to about 0.25 inch in thickness can be employed without seriously lowering the concentration of $Al_2O_3$ in the ultimate solidified cake.

By the expression "flowable concentrate" or "heated flowable concentrate" as employed in the specification and in the appended claims is meant a flowable mixture of solid and liquid sulfate of alumina (either basic or neutral as the case may be) wherein the solidified sulfate content of said mixture is not in excess of about 20% by weight thereof. This flowable mixture is prepared by seeding a concentrated solution of sulfate of alumina having a basicity of from neutral to about 8 percent, an $Al_2O_3$ content of from about 16 to about 18 percent and a water content of from about 40 to about 45 percent. This seeding is brought about by agitating the concentrated solution at a temperature within about 20° C. of the solidification point thereof and preferably within about 5° C. to about 15° C. of the solidification point of said concentrated solution. As the seed grows and solidification increases the flowable concentrate so obtained (provided the total solidified sulfate content thereof does not exceed about 20% by weight thereof) is applied or fed to the cooled moving impervious support. This seeding operation can be and is preferably accelerated by adding seed while agitating the liquid concentrate. The amount of seed or crystals of previously formed sulfate of alumina (neutral or basic as the case may be) added can vary but should not be in excess of about 18 percent by weight of the agitated concentrated solution.

A salient feature of this invention derives from the fact that the heated flowable concentrate of neutral or basic sulfate of alumina on cooling or solidifying exhibits little or no adhesion to the moving support and readily discharges therefrom leaving no or substantially no adhering material on said support. The lack of adhering material on the cooled moving support at the discharge point is particularly apparent when the moving impervious support is wetted or moistened with water (e.g. 10° C. to 30° C. water) at a point prior to it (i.e. the support) being contacted with the heated flowable concentrate of neutral or basic sulfate of alumina. The amount of water employed to wet the surface of the impervious support may vary as aforementioned but in general will be that which provides a thin continuous film on the moving support at the point of contact with the heated flowable concentrate.

It is necessary that the moving impervious support be cooled, that is maintained at a temperature substantially below that of the applied flowable concentrate, for example at a temperature approximately 50° C. to 100° C. below that of the flowable concentrate as applied, but not less than about 5° C. and preferably maintained at a temperature in the range of 10° C. to 30° C. It is particularly preferred that the moving support be cooled with water (e.g. 10° C. to 30° C. water), as for example by a continuous stream of cooling water in contact with the moving support. It may also be air-cooled as for example by blowing cold air against the underside of the moving support.

The moving impervious support for the applied flowable concentrate is preferably an endless belt or band which is so arranged that its upper surface (i.e. the surface to which the flowable concentrate is applied) is wetted or moistened with water at a point prior to the point of application of the flowable concentrate, which belt or band is maintained at a temperature in the range of 10° C. to 30° C. by having its lower or underneath surface in contact with or riding on a flowing stream of cooling 10° C. to 30° C. water. The concentrate upon solidification warps or "pops up" from the belt or band and at the terminus of the belt or band (i.e. where the belt or band bends around a guide pulley or the like) falls off into a suitably positioned receiver, such as a storage bin. Therein, if desired it is air-cooled for a period of 10 to 20 minutes to assure complete internal solidification. Alternatively, the solidified material upon reaching the terminus of said belt or band can be dropped, e.g. by way of a chute, or conveyed directly to another endless belt or band and while being conveyed to storage further cooled by air for a period of about 10 to 20 minutes to assure complete internal solidification. The solidified cake when dropped or falls as aforedescribed breaks up into pieces of relatively small size.

The aforesaid moistened endless belt or band is made of a relatively thin metal sheet of an impervious nature, preferably a ferrous metal such as stainless steel. However, other sheet metal composed of iron or alloys of iron or alloys of non-ferrous metals such as Monel can be employed. It is not necessary that the moving support be an endless belt or band. For example it may be a moving series of pans or trays which is suitably cooled in accordance with this invention.

A more complete understanding of this invention will be obtained from the following description of a preferred form of apparatus suitable for carrying out the process of this invention.

A neutral sulfate of alumina solution is initially prepared by dissolving bauxite in sulfuric acid of 70° concentration until no acidity is present. The clear liquid is then separated from the solid residues by settling and decanted to vessel 18 of the accompanying drawing. This clear liquid in vessel 18 which contains 8.5% $Al_2O_3$ is then boiled down to a concentration of 17% $Al_2O_3$, which corresponds to a hydrate of neutral aluminum sulfate having an average of 14.5 moles of water per mole of neutral aluminum sulfate. This concentrated solution is held at 118° C. for about 15 minutes while constantly stirring with agitator 19, during which time neutral sulfate of alumina crystals are added in an amount of about 10 percent of the weight of the concentrated solution. This produces a flowable concentrate containing approximately 12 percent solidified sulfate which flowable concentrate is poured via the discharge lip 20 onto the moving endless belt 10.

Referring again to the accompanying drawing, the endless belt 10 which is 32 inches wide and is formed of thin stainless steel sheet is passed around roller 11 and 12, one of said rollers being suitably driven by any suitable means (not shown) so as to move the belt continuously in the direction of the arrows. The distance between the center lines of said rollers is 30 feet. The underside of the belt as it moves horizontally from roller 11 to roller 12 rides on and is cooled by the overflowing 20° C. water from inner pan 13. This cooling water is supplied to the inner pan 13 by a distributing pipe 14 having longitudinally spaced orifices 15 at a rate sufficient to continuously overflow inner pan 13. This overflowing water is collected in outer pan 16 and drained off 17. The outside or upper surface of the moving belt is wetted or moistened with 20° C. water at a point prior to it (i.e. the belt) passing completely around roller 11 by a water spray 21. It is preferable that the belt be wetted or moistened at a point approximating that wherein the belt returning from roller 12 contacts roller 11. As the moistened or water-wetted belt moves from roller 11 the heated flowable concentrate of neutral sulfate of alumina described hereinabove is fed or applied to the moving belt by pouring the contents of vessel 18 via the discharge lip 20, which discharging lip may oscillate the width of the belt if desired. As the belt rides horizontally over the cooling water overflowing from inner pan 13, it (i.e. the flowable concentrate) solidifies and as the belt passes around roller 12 the solidified cake falls off the belt leaving substantially no adhering material thereon as attested by the fact that upon operating on a 24 hour cycle at the rate of solidifying several tons of the flowable concentrate per hour less than about 0.5 percent thereof exhibited an adhering tendency with respect to said belt. The temperature of the belt as it passes around roller 12 reaches a maximum of 25° C. in the said 24 hour cycle. The rate of addition of the flowable concentrate to the moving belt and the rate of movement of the belt over said 24 hour cycle is such that the elapsed time of an increment of neutral sulfate of alumina at the point of contact with the belt to the point of it falling off the belt is in the range of 4 to 6 minutes and the thickness of the cake obtained averages ⅜ inch. The solidified cake so produced analyzes 17% $Al_2O_3$ or 57%

$$Al_2O_3 \cdot 3(SO_3)$$

and 43% water.

The solidified cake upon falling off said cooling moving belt 10 drops via a chute not shown), the cake breaking up upon striking the chute into pieces of not more than about one square foot in surface area, to a conveyer belt (not shown) wherein it is carried to the grinding system (not shown) and ground. The dropped cake as it is conveyed to the grinding system is air-cooled (not shown) for a period of about 15 minutes to assure complete internal solidification thereof.

It should be understood that the method of preparing the sulfate solution of 8.5% alumina content described above merely constitutes one conventional method of carrying out the instant process. It is to be understood that any well-known method of treating bauxite, clay, hydrate of alumina, alum shales or other alumina bearing material with sulphuric acid, or any other method of preparing relatively dilute solutions of a sulfate of alumina, having a basicity of neutral to about 8%, may be utilized to ultimately obtain the flowable concentrate employed in the processes of this invention. Moreover, the strength or concentration of alumina to which the starting liquid is boiled down may be varied within the limits previously specified. Although the example describes the use of a temperature of about 118° C. as that characterizing the feed, it is possible to use temperatures as low as 90° C. When this is done, however, a liquor of lower alumina concentrations, but not lower than about 16% alumina, must be used to avoid premature solidification of the concentrated solution. The maximum temperature of the feed generally is about 130° C.

By proceeding in the various ways described herein, it is possible to readily obtain neutral or basic sulfate of alumina in a solid form without incurring the expensive and time-consuming operations heretofore employed.

As aforenoted, this invention applies also to the preparation of a basic sulfate of alumina, as for example those having a basicity of up to about 8%. Basic sulfate of alumina is aluminum sulfate which contains alumina in excess of that required by the formula $Al_2(SO_4)_3$, otherwise frequently written as $Al_2O_3 \cdot 3(SO_3)$. It is convenient to refer to the alumina present as excess alumina in terms of basicity or percentage basicity, thus, a product having a total alumina content of approximately 18 parts in the hundred of which 17 parts are required by the formula $Al_2(SO_4)_3$, otherwise frequently written as $Al_2O_3 \cdot 3(SO_3)$ and one part in excess may be said to have approximately 18% total alumina and a basicity of about 5.6% (i.e. $\frac{1}{18} \times 100$).

What is claimed is:

1. The method of solidifying a concentrated aqueous solution of sulfate of alumina which comprises (1) partially solidifying a concentrated solution of sulfate of alumina having a basicity of from neutral to about 8 percent, an $Al_2O_3$ content of from about 16 to about 18 percent by weight and a water content of about 40 to about 45 percent by weight by seeding same thereby providing a flowable concentrate containing not more than about 20 percent by weight of solidified sulfate of alumina, (2) applying said flowable concentrate to a cooled moving impervious support, the rate of applying said flowable concentrate to said moving support and the rate of movement of said support being such respectively that the elapsed time of an increment of sulfate of alumina from its point of application to said moving support in the form of said flowable concentrate to the point of its discharge from said moving support is not less than about 2 minutes and is in the range of 4 to about 15 minutes for each ⅜ inch average thickness of solidified cake produced on said moving support by the addition of said flowable concentrate and said rates being such respectively that the said solidified cake so produced has a thickness of not more than about 1 inch and not less than about 0.1 inch, (3) cooling and solidifying said flowable concentrate on said moving support by maintaining said moving support at a temperature in the range of about 5° C. to 100° C. below the temperature of said concentrated solution, and (4) discharging the solidified sulfate of alumina from said moving support.

2. The process of claim 1 wherein the discharged solids are air-cooled for a period of about 10 to 20 minutes.

3. The process of claim 1 wherein the temperature of the flowable concentrate is in the range of about 90° C. to about 130° C.

4. The process of claim 1 wherein the moving support is made of a ferrous metal.

5. The process of claim 1 wherein the moving support is an endless belt and is made of a ferrous metal.

6. The process of claim 5 wherein the endless belt is made of stainless steel.

7. The process of claim 3 wherein the moving support is made of a ferrous metal and is water-wetted prior to the contacting thereof with the flowable concentrate.

8. The process of claim 7 wherein the moving support is cooled with 10° C. to 30° C. water.

9. The method of solidifying a concentrated aqueous soltuion of sulfate of alumina which comprises (1) partially solidifying a concentrated solution of sulfate of alumina having a basicity of from neutral to about 8 percent, an $Al_2O_3$ content of from 16 to about 18 percent by weight and a water content of about 40 to about 45 percent by weight by adding seed crystals thereto with agitation thereby providing a flowable concentrate characterized by a temperature in the range of about 90° C. to about 130° C. and containing not more than about 20 percent by weight of solidified sulfate of alumina, (2) feeding said flowable concentrate to the water-wet surface of a cooled moving impervious support made of a ferrous metal, the rate of feeding said flowable concentrate to said moving support and the rate of movement of said moving support being such respectively that the elapsed time of an increment of sulfate of alumina from its point of application to said moving support in the form of said flowable concentrate to the point of its discharge from said moving support in solidified form is in the range of 4 to 6 minutes and said rates respectively being such to produce a solidified cake having a thickness in the range of 0.1 to 1 inch and averaging ⅜ inch thickness, (3) cooling and solidifying said moving support by maintaining said support at a temperature in the range of 10° C. to 30° C. by contacting 10° C. to 30° C. flowing water therewith and (4) discharging the solidified sulfate of alumina from said moving support.

10. The process of claim 9 wherein the sulfate of alumina is neutral sulfate of alumina.

11. The process of claim 10 wherein the moving support is an endless belt made of stainless steel.

12. The process of claim 9 wherein the discharged solids are air-cooled for a period of about 10 to 20 minutes.

13. The process of claim 11 wherein the discharged solids are air-cooled for a period of about 10 to 20 minutes.

14. The method of producing solid sulfate of alumina which comprises the steps of applying a layer of a flowable mixture of (a) solid sulfate of alumina and (b) a concentrated solution of sulfate of alumina which mixture has a basicity of from neutral to about 8 percent, an $Al_2O_3$ content of from about 16 to about 18 percent by weight and a water content of about 40 to about 45 percent by weight and contains not more than 20 percent by weight of said solid sulfate of alumina, to a cooled, moving, impervious, horizontally positioned support which is at a temperature in the range of 50° C. to 100° C. below the temperature of said concentrated solution, the rate of application of said mixture to said support and the rate of movement of said support being such, respectively, that the elapsed time of an increment of said mixture from its point of application to said support to the point of removal of the mixture in solid form from said support is not less than about 2 minutes and is in the range of about 4 to 15 minutes for each ⅜ inch average thickness of said mixture in solid form produced from said flowable mixture and said rates being such, respectively, that said mixture forms on said support as a solid layer not more than 1 inch and not less than 0.1 inch thick; continuing to horizontally move said support under the aforesaid conditions until the outside of said layer of said mixture has solidified on said support; and separating the resulting layer of solidified sulfate of alumina from said support by moving said support in a direction downward from horizontal.

15. The process of claim 1 wherein said flowable concentrate is applied to a water-wet, cooled, moving, impervious, support and wherein the temperature of said support is about 50° C. to 100° C. below the temperature of said flowable concentrate.

References Cited in the file of this patent

UNITED STATES PATENTS

| 1,417,542 | Mauch | May 30, 1922 |

FOREIGN PATENTS

| 154,214 | Australia | Nov. 18, 1953 |
| 954,757 | France | Dec. 30, 1949 |
| 26,616 | Great Britain | 1912 |